United States Patent
Gross et al.

(10) Patent No.: US 10,591,383 B2
(45) Date of Patent: Mar. 17, 2020

(54) CHARACTERIZING THE I/O-PERFORMANCE-PER-WATT OF A COMPUTING DEVICE ACROSS A RANGE OF VIBRATIONAL OPERATING ENVIRONMENTS

(71) Applicant: Oracle International Corporation, Redwood Shores, CA (US)

(72) Inventors: Kenny C. Gross, Escondido, CA (US); Anton A. Bougaev, La Jolla, CA (US); Aleksey M. Urmanov, San Diego, CA (US); Kalyanaraman Vaidyanathan, San Diego, CA (US); David K. McElfresh, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 396 days.

(21) Appl. No.: 15/248,526

(22) Filed: Aug. 26, 2016

(65) Prior Publication Data
US 2018/0058976 A1 Mar. 1, 2018

(51) Int. Cl.
*G01M 7/02* (2006.01)
*G11B 19/04* (2006.01)

(52) U.S. Cl.
CPC .......... *G01M 7/025* (2013.01); *G01M 7/022* (2013.01); *G11B 19/048* (2013.01)

(58) Field of Classification Search
CPC .................... G11B 19/048; G01R 21/133
See application file for complete search history.

(56) References Cited

U.S. PATENT DOCUMENTS

| | | | | |
|---|---|---|---|---|
| 6,446,517 B1* | 9/2002 | Sharma | ................ | G01N 17/002 |
| | | | | 73/865.6 |
| 6,678,627 B1* | 1/2004 | Starr | ..................... | G01M 7/022 |
| | | | | 702/119 |
| 6,799,126 B1* | 9/2004 | Ratcliffe | ................ | G01N 29/14 |
| | | | | 702/35 |
| 8,176,342 B2 | 5/2012 | Vaidyanathan et al. | | |
| 2009/0249899 A1* | 10/2009 | Wong | ..................... | G01M 7/022 |
| | | | | 73/865.6 |
| 2009/0260444 A1* | 10/2009 | Beavers | .................... | B06B 1/18 |
| | | | | 73/665 |

(Continued)

*Primary Examiner* — Michael J Dalbo
(74) *Attorney, Agent, or Firm* — Park, Vaughan, Fleming & Dowler LLP

(57) ABSTRACT

The disclosed embodiments relate to a system that characterizes I/O performance of a computing device in terms of energy consumption across a range of vibrational operating environments. During operation, the system executes a test script on a computing device that is affixed to a programmable vibration table, wherein the test script causes the computing device to perform a predetermined I/O workload. While the test script is executing, the system controls the programmable vibration table to subject the computing device to different vibrational operating environments. At the same time, the system obtains test results by monitoring a progress of the test script and an associated power consumption of the computing device. Finally, the system uses the obtained test results to characterize the I/O performance of the computing device in terms of energy consumption across the range of vibrational operating environments.

16 Claims, 4 Drawing Sheets

(56) References Cited

U.S. PATENT DOCUMENTS

| | | | |
|---|---|---|---|
| 2009/0271643 A1* | 10/2009 | Vaidyanathan | G06F 11/3466 713/320 |
| 2010/0039921 A1* | 2/2010 | Shoji | G11B 7/00736 369/275.3 |
| 2010/0110857 A1* | 5/2010 | McElfresh | G11B 5/455 369/53.43 |
| 2011/0310724 A1* | 12/2011 | Martino | G11B 33/128 369/263.1 |

* cited by examiner

CHARACTERIZING THE I/O-PERFORMANCE-PER-WATT OF A COMPUTING DEVICE ACROSS A RANGE OF VIBRATIONAL OPERATING ENVIRONMENTS

BACKGROUND

Field

The disclosed embodiments generally relate to techniques for characterizing the energy efficiency of computer systems. More specifically, the disclosed embodiments relate to a technique for characterizing the I/O-performance-per-watt of a computing device across a range of different vibrational and environmental operating environments.

Related Art

In recent years, energy costs have become the largest component of the "total cost of ownership" of a data center. In fact, worldwide energy usage for data centers has been growing exponentially for the past 20 years and now exceeds 38,000 megawatts of electricity. Because of this trend, data center operators are becoming increasingly interested in being able to accurately measure the energy efficiency of servers and storage devices in these data centers while executing real workloads.

Measuring the "work done" per "energy consumed" used to be a trivial exercise for the first 25 or so years of the computing industry. For I/O-intensive workloads, "work done" is typically measured in Input-output Operations Per Second (IOPS). Until recently, a system administrator could run a script that generates a fixed IOPS rate on a server, hook up a power meter to the power cord to measure wattage, and then divide the IOPS by the wattage to determine the IOPS per watt.

However, the power usage of modern servers with current-generation spinning Hard Disk Drives (HDDs) is more complicated. This is because the latest generations of spinning HDDs have become hyper-sensitive to low-level ambient vibrations in the environment in which the server is deployed, wherein these vibrations depend to a large extent on ambient temperatures. This is because current-generation servers use variable-speed cooling fans, and nearby Computer-Room Air Conditioners (CRACs) also have variable-speed compressors and blowers, which generate additional vibrations that couple into the metal racks holding the servers.

Consequently, the measurement of "I/O work done" is now a sensitive function of the ambient environment (including vibrations and temperature) in which a server is deployed. Although the "rate" of performing I/O transactions has now become a sensitive function of ambient temperature and vibrations, the impact on "energy efficiency" is even greater, because it is amplified geometrically. To understand this nonlinear degradation of energy efficiency, consider the fact that for a fixed customer workload (for example, updating a 10-TB database), when IOPS goes down because of elevated ambient temperatures and vibration levels, the time to complete the I/O-intensive workload goes up. This means that the energy consumed to complete the customer's job, which can be measured as the integral of power-versus-time, goes up. Thus, while calculating energy efficiency as the total work done per total energy consumed, low-level vibrations cause the numerator to go down and the denominator to go up. This causes significant variations in energy efficiency due to small variations in the vibrational environment in which the server is deployed.

Hence, what is needed is a technique for accurately measuring the I/O-performance-per-watt of a data center across a range of vibrational and environmental operating environments.

SUMMARY

The disclosed embodiments relate to a system that characterizes the I/O performance of a computing device in terms of energy consumption across a range of vibrational operating environments. During operation, the system executes a test script on the computing device, which is affixed to a programmable vibration table, wherein the test script causes the computing device to perform a predetermined I/O workload. While the test script is executing, the system controls the programmable vibration table to subject the computing device to different vibrational operating environments. At the same time, the system obtains test results by monitoring a progress of the test script and associated power consumption of the computing device. Finally, the system uses the obtained test results to characterize the I/O performance of the computing device in terms of energy consumption across the range of vibrational operating environments.

In some embodiments, controlling the programmable vibration table involves using the programmable vibration table to subject the computing device to different vibrational frequencies and different vibrational amplitudes.

In some embodiments, the system also executes the test script after the computing device has been placed into a programmable environmental-testing chamber. While the test script is executing on the computing device, the system uses the programmable environmental-testing chamber to subject the computing device to different ambient temperatures and simulated altitudes, and obtains associated test results. Next, the system uses the associated test results to characterize the I/O performance of the computing device in terms of energy consumption across a range of ambient temperatures and simulated altitudes in addition to the range of vibrational operating environments.

In some embodiments, the test script performs sequential accesses to an outermost sector of a hard disk drive in the computing device.

In some embodiments, characterizing the I/O performance of the computing device involves identifying one or more resonance frequencies that cause significant reductions in I/O performance in terms of energy consumption for the computing device. This enables an engineer to modify the computing device to include damping for the one or more identified resonance frequencies.

In some embodiments, characterizing the I/O performance of the computing device includes developing a vibrational sensitivity profile for the computing device. In these embodiments, the system additionally attempts to qualify the computing device by comparing the vibrational sensitivity profile against a library containing measurements of vibrational spectra obtained from real data centers.

In some embodiments, the I/O performance of the computing device in terms of energy consumption is measured using: IOPS per watt; or IOPS per kilowatt hour.

In some embodiments, the computing device comprises: a computer system that includes one or more hard disk drives; or a storage device that includes one or more hard disk drives.

In some embodiments, monitoring the power consumption of the computing device includes using: an external power meter; or an inferential power-monitoring technique.

DETAILED DESCRIPTION

Figure 1:
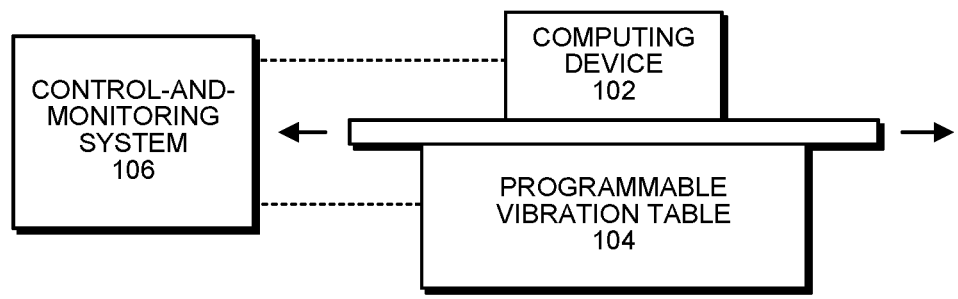
FIG. 1 illustrates a computing device secured to a programmable vibration table in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments relate to a new technique for calculating "work-per-watt" (and more particularly I/O-performance-per-watt) for servers and storage systems containing spinning HDDs and running I/O-intensive workloads. This technique facilitates significant savings in time and human resources, and also enables the implementation of new "work-per-watt" qualification specifications for current-generation computing platforms. This new technique can be directly applied to any new enterprise server platform containing spinning HDDs, and for which "work-per-watt" is either a functional requirement, or is a desirable technical and marketing feature.

The conventional approach for measuring "work-per-watt" is problematic because a prototype product sitting on a non-vibrating test bench in a relatively cool test/development laboratory could "pass" the "work-per-watt" functional requirement in that environment, but could encounter drastically degraded performance in a real data center, wherein the product is housed in a metal rack with other vibrating servers, or in a warm data center where internal fans and/or external CRACs are running faster, and perhaps in a high altitude data center. Note that for a data center located in mile-high Denver, fans typically run about 10% faster to achieve the same internal cooling as an identical server located in a data center near the coast. Moreover, end customers are beginning to operate "warm data centers" because servers can reliably operate with ambient temperatures up to 35° C., and this provides customers with an incentive to "warm up" their data centers to save on energy costs for cooling.

In addition to the fact that "work-per-watt" metrics are now a complex parametric function of ambient temperature, ambient vibration, and altitude for the data center, there are also practical difficulties in characterizing energy efficiency as a multivariate function of environmental metrics. Existing techniques for environmental qualification and characterization of computer servers suffer from the following deficiencies.

(1) Proper test execution requires training of external labs and environmental test engineers for nearly every test.
(2) The required system-specific training and deployment is costly and inefficient and does not scale.
(3) It is difficult to prevent unintentional dissemination of proprietary test procedures and methodologies.
(4) Many tests are scheduled sequentially and require the presence of a human operator in the loop, making the overall energy-efficiency-characterization process prone to human error.

Hence, there is a need for an automated technique for providing parametric qualification and characterization for energy efficiency, which is free of the above mentioned deficiencies and provides "work-per-watt" metrics under all anticipated end-customer environmental conditions of interest (e.g., thermal, vibration-related, altitude-related conditions).

As mentioned above, there has historically been no relationship between "work-per-watt" and the ambient environment for enterprise servers and storage. Consequently, the prior industry solution was to: (1) measure input-output operations per second (IOPS), (2) measure the real-time power utilization, and (3) compute "work-per-watt" as IOPS/watt.

However, for present-generation enterprise server and storage systems, because of the extreme sensitivity of spinning HDDs to low-level ambient vibrations, the above technique has become obsolete because the results measured for a server in a cool data center (~15° C.) located near sea level will be drastically different than if the identical server with identical disk drives is measured in a warm data center (~35° C.) located in mile-high Denver. This is because the increased temperatures cause the vibrational environment to be much different due to elevated server-fan RPMs and the associated HVAC mechanical systems operating at higher speeds, and also because of the fact that fans have to operate at even higher RPMs for the same degree of cooling at elevated altitudes.

To deal with these deficiencies, the disclosed embodiments establish an accurate parametric multivariate functional relationship between IOPS/watt and environmental conditions for all allowable combinations of ambient temperature, vibrational frequency, vibrational amplitude, and altitude.

As mentioned above, HDD I/O rates have become hyper-sensitive to low-level mechanical vibrations. This is because the sensitivity of conventional HDDs to vibrations has grown exponentially with new generations of HDDs. This increased sensitivity is due to the fact that the density of storage for HDDs has grown exponentially with each new generation of HDDs to the point that a write head presently has to hit a track that is less than 20 nanometers in width, wherein the write head is floating only 7 nanometers above a disk surface that is spinning very rapidly (e.g., 5,000-15,000 RPMs). These tight operating parameters make read and write performance very sensitive to internally and externally excited ambient vibrations. Moreover, because servers now have variable-speed fans, ambient vibration levels increase with ambient temperature levels in the data center. Finally, the altitude of the data center affects fan speeds (and hence vibration levels) because air is less dense at higher altitudes than for data centers located near sea level, resulting in higher fan speeds, which are required to keep internal CPU temperatures at the same levels; these higher fan speeds will increase vibration amplitudes and frequencies.

Hence, the disclosed embodiments provide a systematic, accurate, and reproducible technique that achieves parametric, multivariate "work-per-watt" characterization of prototype platforms under different combinations of end-customer ambient environmental conditions in terms of vibrational amplitude, vibrational frequency, temperature, and altitude.

Testing System

The vibrational and atmospheric testing described above can be performed using one or more types of testing systems. For example, FIG. 1 illustrates a device-under test (computing device 102) secured to a programmable vibration table 104 in accordance with the disclosed embodiments. Computing device 102 can generally include any type of computer-related device whose computational performance is affected by vibrations. Note that any computer-related device that includes HDDs is significantly affected by vibrations. Hence, computing device 102 can include a server, a storage device, a desktop computer system, a laptop computer system, a system controller or any other type of computational device.

Programmable vibration table 104 can include any type of apparatus, such as a shake table or other type of vibration testing equipment, which can subject computing device 102 to different vibrations. In the disclosed embodiments, programmable vibration table 104 can be programmed to subject computing device 102 to vibrations having different frequencies and amplitudes.

The testing system illustrated in FIG. 1 is controlled by a control-and-monitoring system 106, which as illustrated in FIG. 1 and can communicate with computing device 102 and programmable vibration table 104. Note that portions of control-and-monitoring system 106 can be located in a separate computing system dedicated to testing, or in computing device 102 itself.

Figure 2:
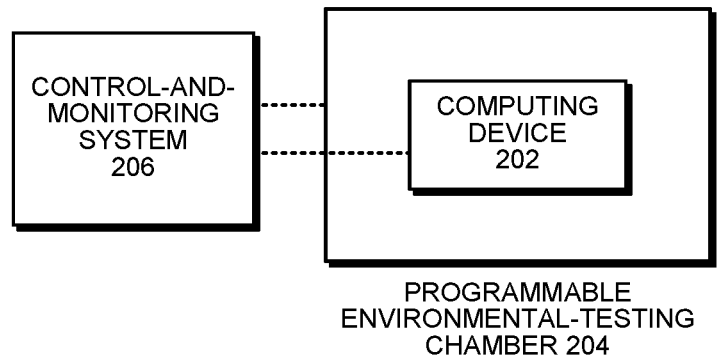
FIG. 2 illustrates a computing device inside a programmable environmental-testing chamber in accordance with the disclosed embodiments.

In order to subject a computing device 202 to different atmospheric conditions, the computing device 202 can be operated inside a programmable environmental-testing chamber 204 as is illustrated in FIG. 2. This programmable environmental-testing chamber 204 can include any type of system that can subject computing device 202 to different temperatures and different atmospheric pressures. Note that the testing system illustrated in FIG. 2 operates under control of a control-and-monitoring system 206, which is similar to control-and-monitoring system 106 illustrated in FIG. 1.

In some embodiments, the systems illustrated in FIGS. 1 and 2 are combined into a hybrid system that enables vibration testing and environmental testing to be performed at the same time. For example, the hybrid system can comprise a programmable vibration table located inside an environmental testing chamber.

Process of Characterizing I/O Performance

Figure 3:
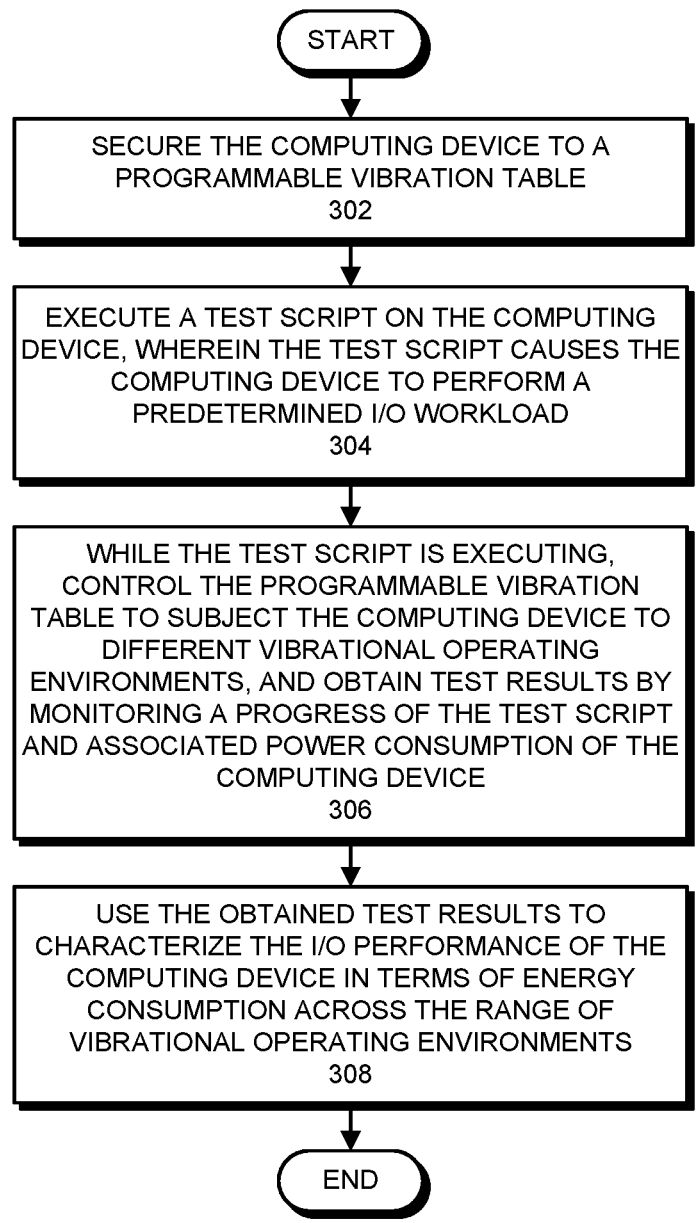
FIG. 3 presents a flowchart illustrating the process of characterizing the I/O performance of the computing device in terms of energy consumption across a range of vibrational operating environments in accordance with the disclosed embodiments.

FIG. 3 presents a flowchart illustrating the process of characterizing the I/O performance of the computing device in terms of energy consumption across a range of vibrational operating environments in accordance with the disclosed embodiments. First, the computing device is secured to a programmable vibration table (step 302). Next, the system executes a test script on the computing device, wherein the test script causes the computing device to perform a predetermined I/O workload (step 304). While this test script is executing, the system controls the programmable vibration table to subject the computing device to different vibrational operating environments, and the system obtains test results by monitoring a progress of the test script and associated power consumption of the computing device (step 306). Finally, the system uses the obtained test results to characterize the I/O performance of the computing device in terms of energy consumption across the range of vibrational operating environments (step 308).

Figure 4:
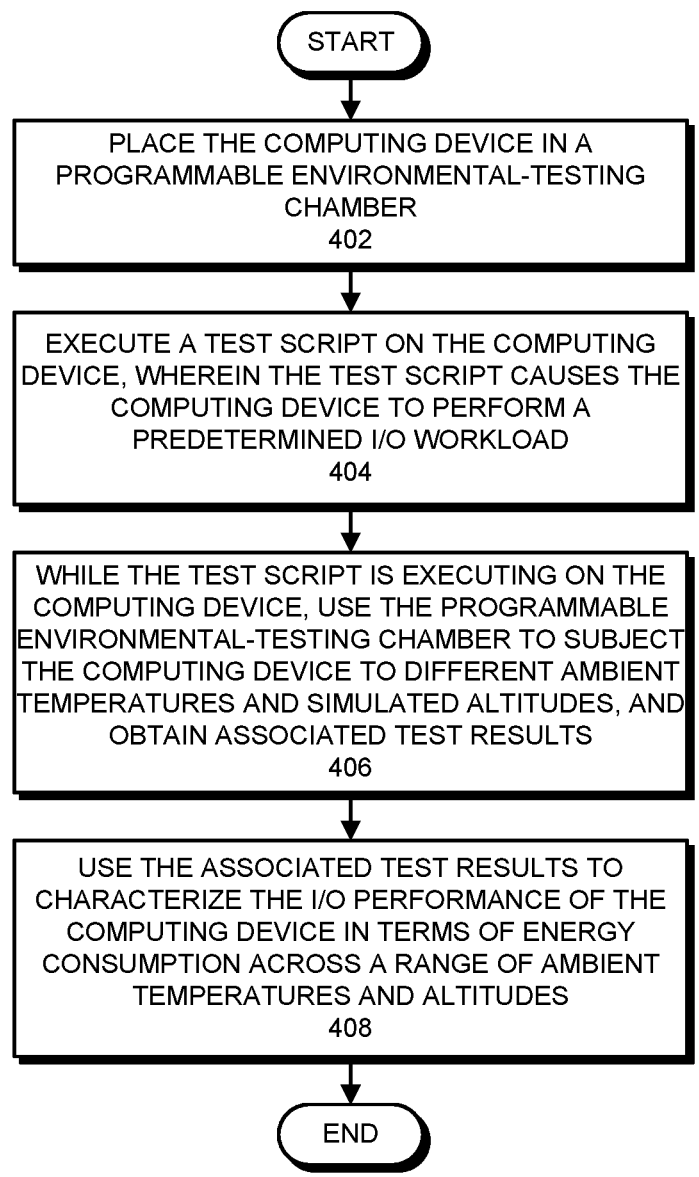
FIG. 4 presents a flowchart illustrating the process of characterizing the I/O performance of the computing device in terms of energy consumption across a range of ambient temperatures and simulated altitudes in accordance with the disclosed embodiments.

FIG. 4 presents a flowchart illustrating the process of characterizing the I/O performance of the computing device in terms of energy consumption across a range of ambient temperatures and simulated altitudes in accordance with the disclosed embodiments. First, the computing device is placed in a programmable environmental-testing chamber (step 402). Next, the system executes a test script on the computing device, wherein the test script causes the computing device to perform a predetermined I/O workload (step 404). While the test script is executing on the computing device, the system uses the programmable environmental-testing chamber to subject the computing device to different ambient temperatures and simulated altitudes, and obtains associated test results (step 406). Finally, the system uses the associated test results to characterize the I/O performance of the computing device in terms of energy consumption across a range of ambient temperatures and altitudes in addition to the range of vibrational operating environments (step 408). (Note that an altitude can be simulated by subjecting the computing device to an atmospheric pressure that is consistent with the altitude.)

Example

In one exemplary testing scenario, the operations outlined in the flowcharts that appear in FIGS. 3-4 are performed as follows. If there exist two identical Systems Under Test (SUTs), one unit is fixed to a programmable vibration table, and the other unit is placed in a programmable environmental-testing chamber. Note that this technique can also be can be used if only one SUT exists. However, in this case the characterization procedure is applied sequentially, first to the SUT on the programmable vibration table, and second in the programmable environmental-testing chamber. The remainder of this example assumes the existence of two identical SUTs that are tested in parallel.

In the first step of the testing scenario, real-time dynamic power monitoring is actuated on both SUTs to measure power in parallel with environmental conditions and IOPS/watt metrics. This power can be monitored either by using an external power meter, or through "soft metering" using an inferential power-monitoring technique. (Please see U.S. Pat. No. 7,869,965, entitled "Inferential Power Monitoring without Voltage/Current Transducers," by inventors Kenny C. Gross, Kalyanaraman Vaidyanathan, and Ramakrihsna C. Dhanekula, issued 11 Jan. 2011, which is hereby incorporated by reference.)

Next, a test script is executed on both SUTs in parallel to generate a dynamic deterministic I/O throughput, and then "baseline" IOPS metrics are measured for both SUTs at: (1) a condition of zero ambient vibrations, (2) a lowest allowable ambient temperature (e.g., 15° C.), and (3) an atmospheric pressure associated with zero altitude (sea level).

Then, while this test script executes in parallel on both SUTs, vibrational and environmental testing parameters are varied systematically to span all desired permutations of end-user conditions, including vibrational frequency, vibrational amplitude, ambient temperature, and altitude. Note that vibrational frequency and amplitude can be separately controlled by performing first a "swept sine" test, wherein the vibrational amplitude is fixed, while the vibrational frequency sweeps through a range from 5 Hz to 2000 Hz. Next, a random-spectrum is used, spanning the same 5 Hz to 2000 Hz range, but with the vibrational amplitude varying from 0.01 GRMS to 0.3 GRMS. Note that these ranges of vibrational amplitudes and frequencies were derived from real measurements taken from a large number of real data centers. During this testing process, test result time-series telemetry is collected by and stored in an SQL data base.

The system then uses this collected telemetry data to generate and archive a test history for both SUTs, and then computes an accurate quantitative parametric multivariate functional relationship between IOPS/watt and environmental conditions for all allowable combinations of ambient temperature, altitude, vibrational frequency and vibrational amplitude.

Finally, the system can use the test results to configure automated alerts that are configured to detect possible field and customer service problems, wherein these automated alerts will be triggered if conditions are identified for which IOPS/watt metrics drop below design specifications for a specific platform associated with the SUTs.

Note that the above-described testing process is low-cost and generates comprehensive, deterministic and reproducible "work-per-watt" metrics with good quality assurance, and minimal opportunities for human error.

Applications for I/O-Performance-Per Watt Characterization

Figure 5:
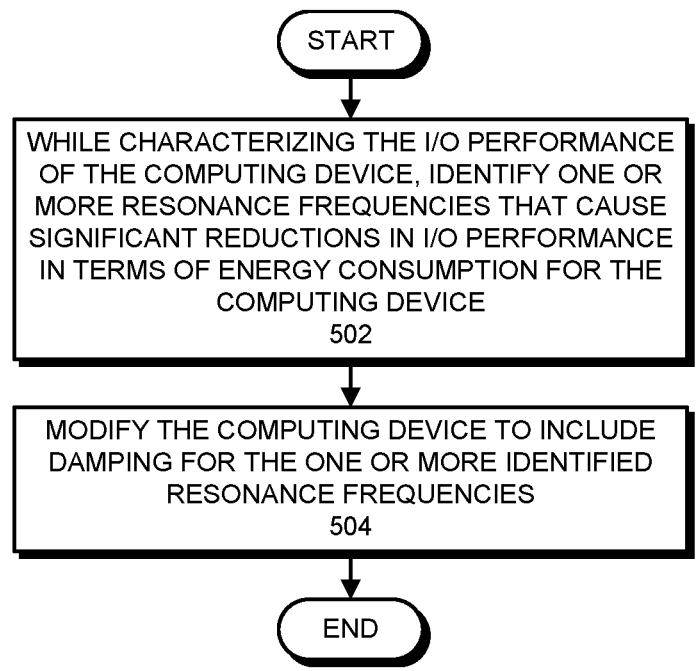
FIG. 5 presents a flowchart illustrating the process of identifying resonance frequencies for the computing device and modifying the computing device to include damping for the identified resonance frequencies in accordance with the disclosed embodiments.

The above-described power-efficiency characterization can be used in a number of ways. For example, FIG. 5 presents a flowchart illustrating the process of identifying resonance frequencies for the computing device and modifying the computing device to include damping for the identified resonance frequencies in accordance with the disclosed embodiments. First, while characterizing the I/O performance of the computing device, the system identifies one or more resonance frequencies that cause significant reductions in I/O performance in terms of energy consumption for the computing device (step 502). Next, an engineer modifies the computing device to include damping for the one or more identified resonance frequencies (step 504).

Figure 6:
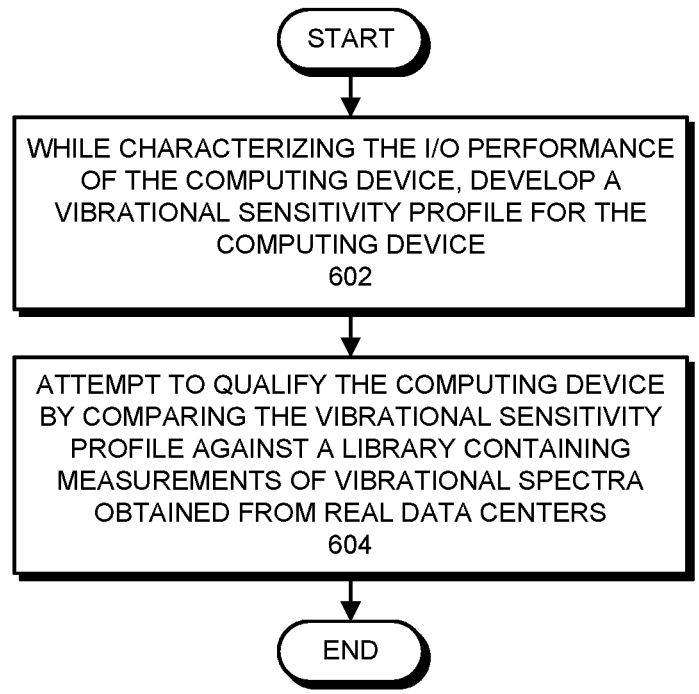
FIG. 6 presents a flowchart illustrating the process of developing a vibrational-sensitivity profile for the computing device and using the vibrational-sensitivity profile to qualify the computing device in accordance with the disclosed embodiments.

In another example, FIG. 6 presents a flowchart illustrating the process of developing a vibrational-sensitivity profile for the computing device and using the vibrational-sensitivity profile to qualify the computing device in accordance with the disclosed embodiments. First, while characterizing the I/O performance of the computing device, the system develops a vibrational sensitivity profile for the computing device (step 602). Next, the system attempts to qualify the computing device by comparing the vibrational sensitivity profile against a library containing measurements of vibrational spectra obtained from real data centers (step 604).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for characterizing an I/O performance of a computing device in terms of energy consumption across a range of vibrational operating environments, comprising:
   executing a test script on the computing device, which is secured to a programmable vibration table, wherein the test script causes the computing device to perform a predetermined I/O workload;
   while the test script is executing,
      controlling the programmable vibration table to subject the computing device to different vibrational operating environments, wherein controlling the programmable vibration table involves using the programmable vibration table to subject the computing device to different vibrational frequencies and different vibrational amplitudes, wherein vibrational frequency and vibrational amplitude are separately controlled by first performing a "swept sine" test wherein the vibrational amplitude is fixed while the vibrational frequency sweeps through a range, and then performing a second test where a random-spectrum of vibrational frequencies from the range is used with varying vibrational amplitudes, wherein the different vibrational frequencies and different vibrational amplitudes are chosen from real measurements taken from a number of real data centers, and obtaining test results by monitoring a progress of the test script and an associated power consumption of the computing device; and using the obtained test results to characterize the I/O performance of the computing device in terms of energy consumption across the range of vibrational operating environments.

2. The method of claim 1, wherein the method further comprises:

placing the computing device in a programmable environmental-testing chamber; and while the test script is executing on the computing device, using the programmable environmental-testing chamber to subject the computing device to different ambient temperatures and simulated altitudes, and obtaining associated test results; and using the associated test results to characterize the I/O performance of the computing device in terms of energy consumption across a range of ambient temperatures and simulated altitudes in addition to the range of vibrational operating environments.

3. The method of claim 1, wherein the test script performs sequential accesses to an outermost sector of a hard disk drive in the computing device.

4. The method of claim 1, wherein characterizing the I/O performance of the computing device involves identifying one or more resonance frequencies that cause significant reductions in I/O performance in terms of energy consumption for the computing device; and wherein the method further comprising modifying the computing device to include damping for the one or more identified resonance frequencies.

5. The method of claim 1, wherein the I/O performance of the computing device in terms of energy consumption is measured using one or more of:

TOPS per watt; and

TOPS per kilowatt hour.

6. The method of claim 1, wherein the computing device comprises one or more of:

a computer system that includes one or more hard disk drives; and a storage device that includes one or more hard disk drives.

7. The method of claim 1, wherein monitoring the power consumption of the computing device includes using one of:

an external power meter; and an inferential power-monitoring technique.

8. One or more non-transitory computer-readable storage media storing instructions that when executed by a computing device and associated test equipment cause the computing device and associated test equipment to perform a method for characterizing an I/O performance of the computing device in terms of energy consumption across a range of vibrational operating environments, the method comprising:

executing a predetermined I/O workload on the computing device, which is secured to a programmable vibration table;

while the predetermined I/O workload is executing, controlling the programmable vibration table to subject the computing device to different vibrational operating environments, wherein controlling the programmable vibration table involves using the programmable vibration table to subject the computing device to different vibrational frequencies and different vibrational amplitudes, wherein vibrational frequency and vibrational amplitude are separately controlled by first performing a "swept sine" test wherein the vibrational amplitude is fixed while the vibrational frequency sweeps through a range, and then performing a second test where a random-spectrum of vibrational frequencies from the range is used with varying vibrational amplitudes, wherein the different vibrational frequencies and different vibrational amplitudes are chosen from real measurements taken from a number of real data centers, and obtaining test results by monitoring a progress of the execution of the predetermined I/O workload and an associated power consumption of the computing device; and using the obtained test results to characterize the I/O performance of the computing device in terms of energy consumption across the range of vibrational operating environments.

9. The one or more non-transitory computer-readable storage media of claim 8, wherein the method further comprises:

controlling a programmable environmental-testing chamber into which the computing device is inserted to subject the computing device to different ambient temperatures and simulated altitudes;

obtaining associated test results; and using the associated test results to characterize the I/O performance of the computing device in terms of energy consumption across a range of ambient temperatures and simulated altitudes in addition to the range of vibrational operating environments.

10. The one or more non-transitory computer-readable storage media of claim 8, wherein the predetermined I/O workload performs sequential accesses to an outermost sector of a hard disk drive in the computing device.

11. The one or more non-transitory computer-readable storage media of claim 8, wherein characterizing the I/O performance of the computing device involves identifying one or more resonance frequencies that cause significant reductions in I/O performance in terms of energy consumption for the computing device, whereby the computing device can be modified to include damping for the one or more identified resonance frequencies.

12. The one or more non-transitory computer-readable storage media of claim 8, wherein the I/O performance of the computing device in terms of energy consumption is measured using one or more of:

TOPS per watt; and

TOPS per kilowatt hour.

13. The one or more non-transitory computer-readable storage media of claim 8, wherein the computing device comprises one of:

a computer system that includes one or more hard disk drives; and a storage device that includes one or more hard disk drives.

14. The one or more non-transitory computer-readable storage media of claim 8, wherein monitoring the power consumption of the computing device includes using one or more of:
- an external power meter; and
- an inferential power-monitoring technique.

15. A system for characterizing an I/O performance of a computing device in terms of energy consumption across a range of vibrational operating environments, comprising:
- a programmable vibration table to which the computing device is attached;
- a data-gathering system that gathers data from the computing device;
- a control mechanism that controls the programmable vibration table, the data gathering system and the computing device, wherein during operation, the control mechanism:
  - triggers execution of a test script on the computing device, wherein the test script causes the computing device to perform a predetermined I/O workload;
  - while the test script is executing,
    - controls the programmable vibration table to subject the computing device to different vibrational operating environments, wherein controlling the programmable vibration table involves using the programmable vibration table to subject the computing device to different vibrational frequencies and different vibrational amplitudes, wherein vibrational frequency and vibrational amplitude are separately controlled by first performing a "swept sine" test wherein the vibrational amplitude is fixed while the vibrational frequency sweeps through a range, and then performing a second test where a random-spectrum of vibrational frequencies from the range is used with varying vibrational amplitudes, wherein the different vibrational frequencies and different vibrational amplitudes are chosen from real measurements taken from a number of real data centers, and
    - obtains test results by monitoring a progress of the test script and an associated power consumption of the computing device; and
  - uses the obtained test results to characterize the I/O performance of the computing device in terms of energy consumption across the range of vibrational operating environments.

16. The system of claim 15,
wherein the system further comprises a programmable environmental-testing chamber into which the computing device can be inserted; and
wherein while the test script is executing on the computing device, the control mechanism:
- uses the programmable environmental-testing chamber to subject the computing device to different ambient temperatures and simulated altitudes;
- obtains associated test results; and
- uses the associated test results to characterize the I/O performance of the computing device in terms of energy consumption across a range of ambient temperatures and altitudes in addition to the range of vibrational operating environments.

* * * * *

UNITED STATES PATENT AND TRADEMARK OFFICE
CERTIFICATE OF CORRECTION

PATENT NO. : 10,591,383 B2  
APPLICATION NO. : 15/248526  
DATED : March 17, 2020  
INVENTOR(S) : Gross et al.

Page 1 of 1

It is certified that error appears in the above-identified patent and that said Letters Patent is hereby corrected as shown below:

In Column 9, Line 45, in Claim 5, delete "TOPS" and insert -- IOPS --, therefor.

In Column 9, Line 46, in Claim 5, delete "TOPS" and insert -- IOPS --, therefor.

In Column 10, Line 59, in Claim 12, delete "TOPS" and insert -- IOPS --, therefor.

In Column 10, Line 60, in Claim 12, delete "TOPS" and insert -- IOPS --, therefor.

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*